United States Patent [19]

Barabas

[11] 3,842,538
[45] Oct. 22, 1974

[54] METHOD OF PRODUCTION OF HYBRID SEED-GRAIN
[75] Inventor: Zoltan Barabas, Szeged, Hungary
[73] Assignee: Gabonatermesztesi Kutato Intezet, Szeged, Hungary
[22] Filed: Mar. 9, 1973
[21] Appl. No.: 339,654

[30] Foreign Application Priority Data
Mar. 13, 1972 Hungary.............................. GA 1082

[52] U.S. Cl. .................................................... 47/58
[51] Int. Cl.............................................. A01h 1/02
[58] Field of Search............................ 47/58, DIG. 1

[56] References Cited
UNITED STATES PATENTS
2,753,663   7/1956   Jones..................................... 47/58

OTHER PUBLICATIONS
Male Sterility in Sorghum, Stephens, Journ. Amer. Soc. of Agronomy, 1937, page 692 relied on.
Progress in Corn Production, Jones, Amer. Seed Trade, Assoc., 1950 page 14 relied on.
Methods of Plant Breeding, Hayes et al., McGraw-Hill, 1955, pp. 191-2 relied on.

Primary Examiner—Robert E. Bagwill
Attorney, Agent, or Firm—Young & Thompson

[57] ABSTRACT

Hybrid seed-grain is produced by cytoplasmic male sterility, by introducing into the male seed a marking color gene, preferably by back-crossing. A minor proportion of thus-treated male seed is admixed with a major proportion of untreated female seed and comingled seed is sowed, grown, reaped and threshed, after which the hybrid grains are colorimetrically separated from the unmarked grains. The previous need to segregate male and female seeds and plants and harvested grain, is thus avoided.

6 Claims, No Drawings

METHOD OF PRODUCTION OF HYBRID SEED-GRAIN

The invention relates to a method of production hybrid (heterosis) seed-grain, where the exploitation of the effect of heterosis takes place by way of cytoplasmic male-sterility.

Since the discovery of cytoplasmic male or androsterility, in principle there is no obstacle to the production of hybrid grain. Still research work to date falls short of inventing methods of practical use, notwithstanding the circumstance that the biologic possibility, i.e. the cytoplasmic-genic male-sterile line, the analogous line for the maintenace of the former, and the restorer-line suppressing it, was present.

In the earlier methods of producing hybrid seed-grain the seeds were sown in special mother and father rows, in what are called strips. This was necessary because hybrid seed-grain is derived from seeds grown in the mother rows, whereas for the purpose of generation of hybrid posterity, the plants of the father rows have only a pollen supplying, pollinating role.

For this reason the strips of the mother and father plants had to be sown with utmost care so as to prevent promiscuity. What was even more difficult, was harvesting without allowing the seeds to mingle. The avoidance of these risks introduced a considerable difficulty in the production of hybrid seed-grain.

As a matter of fact as taught by experience when the strips consist of only a few rows of plants, pollination takes place in the proper manner. Nevertheless, sowing and reaping free from mingling is extremely difficult. On the other hand, if the strips are wide, then both sowing and reaping will be simplified considerably, still inside the male-sterile mother strips, i.e. at locations distant from the father rows, a considerable uncertainty factor will be introduced into pollination. The reason is that the pollen of certain sorts of grain are rather heavy, and owing to its aptness to drop to the ground quickly, it will cover short distances only.

Owing to these difficulties experts thought that the spread of hybrid grain could not be expected, its faculty of combining (i.e. the heterosis effect) was in particular in the case of wheat very limited, and at the same the costs of production were in excess of the surplus crops reaped with the use of hybrid seed-grain.

The purpose of the present invention is to provide a method of growing hybrid seed-grain which even for a relatively lower hybridization effect will render the production of hybrid grain profitable.

The invention relies on the recognition that if when growing the grain supplying hybrid seed-grain, either of the maternal or the paternal lines is marked with a colour gene, which will produce a distinct discolouration even in the following generation, then after harvesting both the maternal and paternal lines the seeds may easily be distinguished by their colouring.

Another recognition embodied by the invention is that after harvesting the hybrid progeny so produced, possibly after threshing and winnowing, the grains distinguishable by their colouration may be segregated in a reliable manner with the aid of a selecting device sensitive to colour. Here the grain grown in the maternal line will supply the wanted hybrid seed-grain, whereas the produce of the paternal line differing from the former in colouring may be scrapped.

In conformity with the goal set the invention relates to a process of producing hybrid (heterosis) seed-grain where heterosis is made use of by the method of cytoplasmic male-sterility. The method consists in introducing into one of the parents of the hybrid to be produced a marking colour gene. The parent seeds are then sown commingled and so the plant individuals of the parental lines will be in an optimum proximity. The crops are then reaped and garnered, and after threshing the hybrid grains are segregated from grains of the pure line.

Another feature of the invention is that the colour gene is introduced into one of the parents preferably by way of back-crossing. For the preservation of the colour of the endosperm constituting the farinaceous portion of the grain for marking a colour gene colouring the pericarp of the grain is used.

During the intermingled sowing of the grains of the parental line, the seeds of the maternal line growing the hybrid seed should constitute the larger portion of the total amount of seeds, as compared to the seeds of the pollen-supplying autogamic paternal line. After garnering the hybrid seeds are segregated by a colour selective e.g. photoelectrical process.

As compared to earlier hybrid seed-grain growing methods, the process according to the invention offers several advantages. Foremost is the simplicity of production, i.e. the seeds of the paternal and maternal lines may be sown commingled, and the crops can be reaped jointly. It is due to commingled sowing that the parents supplying the hybrids will be in close proximity in the soil and consequently pollination will take place with safety. This also means that none of the seed will be wasted, and so the yield of the hybrid seed-grain will be greater than heretofore.

Another benefit of the method is that on a definite plot comparatively few male seeds and a comparatively large number of female seeds have to be sown in order to achieve the desired result. This circumstance adds considerably to the yield, since the grains of the hybrid seed-grain grow only on the female plants.

The economy of the process according to the invention is guaranteed by the fact that the separation of the grains marked by a colour gene takes place in a reliable form, automatically, in the last phase of the process. Neither at sowing nor at reaping do any special measures have to be taken or recourse had to specific techniques.

The invention will be made clear by a practical example. In the following a series of experiments for the production of hybrid wheat will be described.

As it is known the grains of the various sorts of wheat are distinguishable by a whitish, yellowish or light-brownish hue. There is, however, a sort of wheat whose grains are of a specially striking crimson colour. This colour dyes the pericarp of the grain of wheat, so that the grains will be easily distinguishable from any others. This crimson coloured pericarp is inherited by a series of subsequent generations.

Although marking for eliciting the effect of heterosis may be carried through optionally by introducing the colour gene into the male or female line, as taught by experience better results are obtained if the male line is marked. Exchangeability may be guaranteed if the colour gene dyes the pericarp, whereas the endosperm constituting the farinaceous portion of the grain preserves it colour.

This means at the same time that the grist of the grains will be of the usual white colour. Preferably the male line should be marked, because the hybrid seed-grain is grown by the female plants, and this seed-grain is eventually distributed among the farmers who will surely not mistrust grain of traditional colouring.

Experience also teaches that colour genes introduced into the male line descend to posterity and will be preserved in their purity in the paternal line. As a matter of fact the male plants pollinate with their own pollen their own pistils, and so, as the produce of the male line, grain marked with the colour gene will be reaped. The female plants pollinated by the same pollen will produce the original unmarked hybrid grains, since the colour of the pericarp is transmitted in the female line.

It has also been found that marking by means of colour genes is in principle applicable to all sorts of grain or cereals, and that with the aid of the method hybrid seed-grain of good quality and satisfactory quantity may be produced. In each sort of cereals colour gene may be introduced in either of the hybrid parents. Introduction of the colour gene should, however, preferably be effected by way of back-crossing.

What we claim is:

1. A method of producing hybrid seed-grain by cytoplasmic male sterility, comprising introducing into one of the parents of the hybrid to be produced a color gene, comingling the parent seeds one of which contain said color gene, sowing the comingled seeds and growing plants therefrom, harvesting and threshing the grains from said plants thereby to produce comingled hybrid grains and pure grains, and thereafter separating the hybrid grains from the pure grains according to color.

2. A method as claimed in claim 1, in which said color gene is introduced into said one parent by back-crossing.

3. A method as claimed in claim 1, in which a color gene coloring the pericarp of the grains is used for marking.

4. A method as claimed in claim 1, in which said one parent is the male.

5. A method as claimed in claim 4, in which said parent seeds comprise a minor proportion of male and a major proportion of female.

6. A method as claimed in claim 1, in which said separation according to color is performed photoelectrically.

* * * * *